United States Patent Office 3,556,608
Patented Jan. 19, 1971

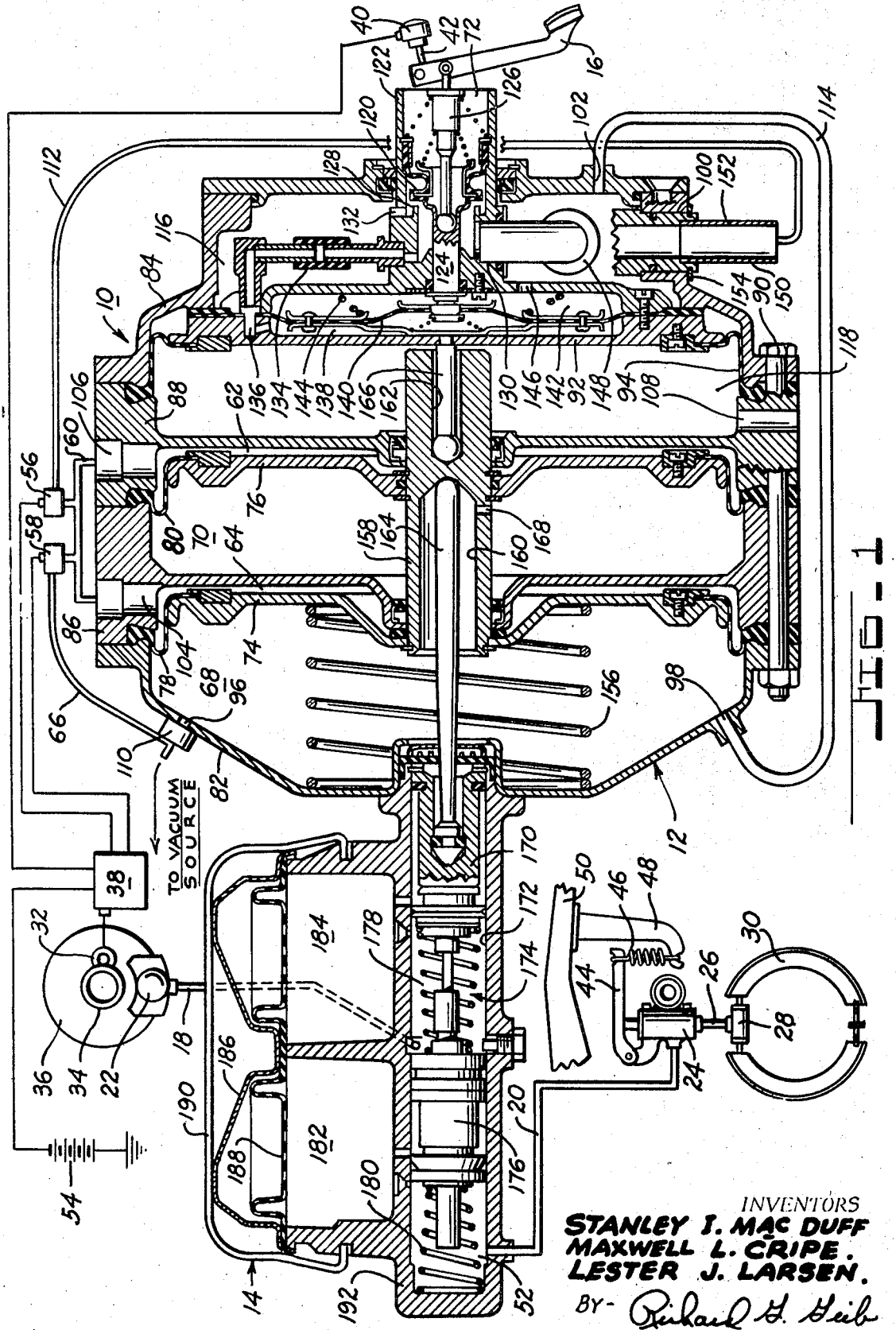

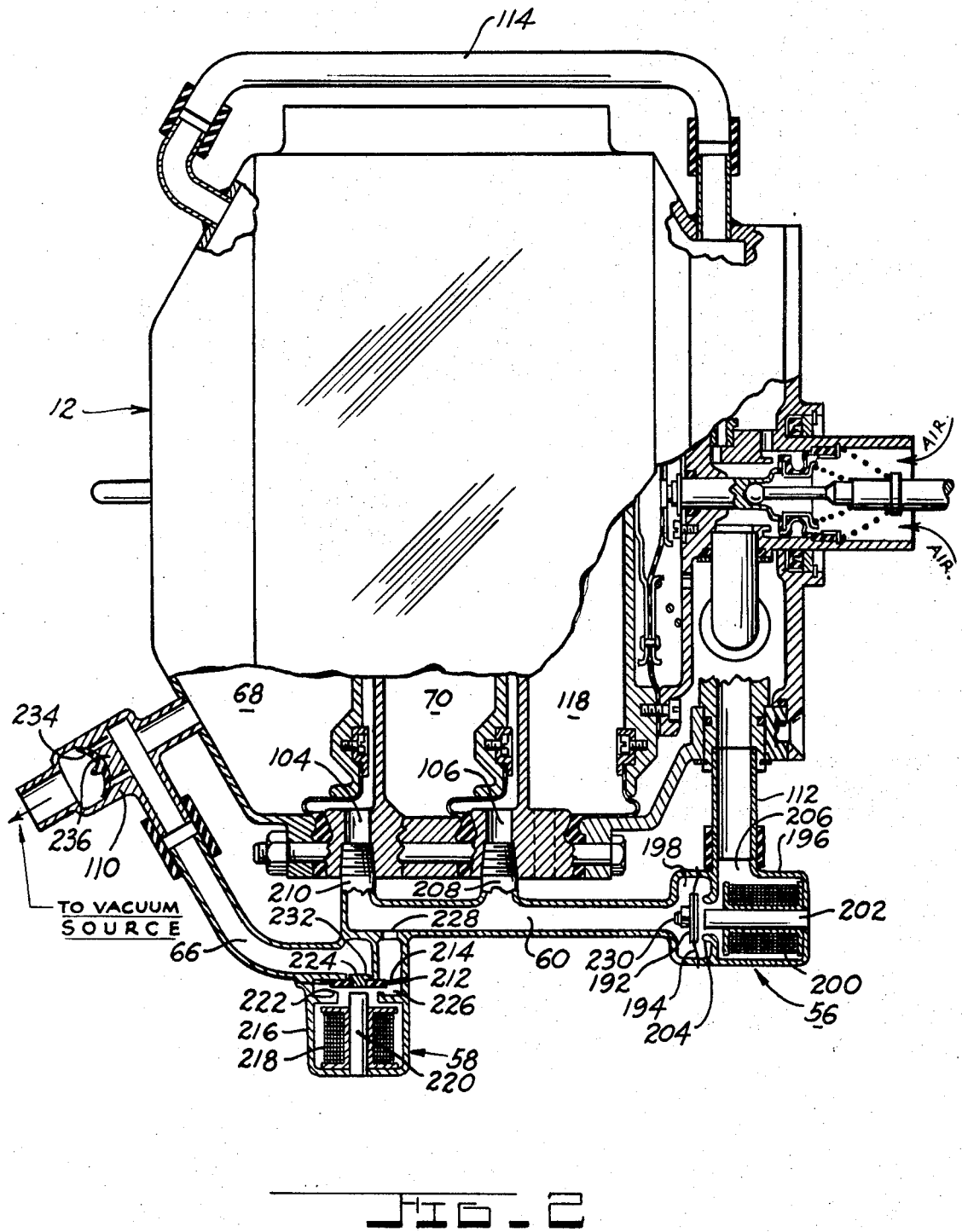

3,556,608
ANTI-SKID MEANS
Stanley I. MacDuff, Maxwell L. Cripe, and Lester J. Larsen, South Bend, Ind., assignors to The Bendix Corporation, a corporation of Delaware
Filed Sept. 12, 1968, Ser. No. 759,296
Int. Cl. B60t 8/12
U.S. Cl. 303—21    11 Claims

ABSTRACT OF THE DISCLOSURE

A power brake system and servomotor wherein a skid sensing means is adapted to automatically take over control of the servomotor from the vehicle operator to modulate braking at its maximum effectiveness, and which is further improved by brake pressure proportioning means to accommodate vehicle weight shifting during deceleration.

SUMMARY

During recent years the need for anti-skid systems to protect against wheel locking during braking has become as much a requirement for automotive vehicles as has been the practice for airplanes.

This need has brought several practical answers to the field within the range of a consumer's ability to afford same. However, for the most part these systems involve the use of separate modulators connected between a source of brake pressure and the vehicle brakes. None to date have devised how to avail of the servomotor common to today's vehicle brake systems as both the source for braking pressure and the means to modulate same regardless of the operator's natural instincts to prevent uncontrollable brake locking.

The object of this invention is to, therefore, advance the progress of safety apparatus for automotive vehicles by simply utilizing a power brake means as a source of brake pressure and as a means to control same automatically so that vehicle deceleration may be increased to minimize stopping distances and maintain the operator's controllability over the vehicle during braking under all operational environments.

Another object of far greater significance is to disclose how vehicle anti-skid means can be made available to the consumer market at the least cost possible by the elimination of heretofore additions to a brake system in that their function can be combined in existing brake system components to reduce the complexity of a vehicle brake system.

DRAWING DESCRIPTION

Other objects and advantages of this invention will most certainly appear to those skilled in the art from the following description of the drawings in which:

FIG. 1 is a cross section of a servomotor for an anti-skid brake system in accordance with the principles of this design in which the various other components to complete the system are integrated therewith; and FIG. 2 is a partial cross section of the servomotor only of FIG. 1 showing in detail the components added to a conventional type servomotor to bring about the adaptation of same for an anti-skid brake system.

DETAILED DESCRIPTION

With regard to FIG. 1 there should be shown a servomotor 10 having a motor housing 12 and a master cylinder 14 that are mounted in a vehicle to be operable by a brake pedal 16. The servomotor 10 as thus constituted, provides braking pressures via conduits 18 and 20 to a front wheel disc brake actuator 22 and a load proportioning valve 24 connected by a conduit 26 to a wheel cylinder 28 for the rear drum brakes 30, respectively. A vehicle brake sensing mechanism 32 is operatively connected via a ring gear 34 to the front brake disc 36 to provide a signal to a computer mechanism 38 which is energized by means of a switch 40 whenever the brake pedal 16 is pivoted by the operator to engage the contacts associated with plunger 42 of the switch 40. The brake proportioning valve 24 is rendered responsive to vehicle weight shifting in that it has a lever arm 44 connected by a spring 46 to a bracket 48 depending from the vehicle frame 50 to regulate the conduction of braking pressure from the secondary chamber 52 of master cylinder 14 to the wheel cylinder 28. Details of the computer system 38 and the load proportioning valve 24 can be readily observed within the prior art and further reference thereto is not deemed necessary in order to explain their function to those skilled in the art of this invention.

The vehicle battery 54 provides the source of energy for the computer system 39 and a pair of solenoid valves 56 and 58 connected by conduit 60 to the control pressure chambers 62 and 64 of the motor 12, and by conduit 66 to reference pressure chambers 68 and 70 also of the motor 12. With regard to the motor envisioned so far it is a vacuum-air type motor wherein vacuum forms the reference pressure in chambers 68 and 70 and atmosphere entering via an inlet 72 of the valve mechanism forms the control pressure for chambers 62 and 64. The chambers are separated by wall beams 74 and 76 connected by rolling diaphragms 78 and 80 to the housing formed of ends 82 and 84 with intermediate sections 86 and 88 joined together by bolts such as bolt 90 with the beads of diaphragms 78 and 80 interposed to seal the connection. In addition the valve mechanism is carried by a wall 92 having a rolling diaphragm 94 whose peripheral bead also acts as a seal between the end shell 84 and intermediate section 88 when joined by a bolt 90. End shells 82 and 84 have ports 96, 98 and 100, 102 provided therethrough; whereas intermediate section 86 has a port 104 and intermediate section 88 has ports 106 and 108 provided therethrough.

As seen, the conduit 66 is communicated via a vacuum check valve 110 to the inlet port 96 and the vacuum source, which the skilled in the art will readily understand as being the intake manifold for the engine of the associated vehicle (not shown). A conduit 112 communicates port 100 to the solenoid valve 56, which will be explained in further detail hereinafter; whereas conduit 60 communicates ports 104 and 106 with the solenoid valves 56 and 58. Another conduit 114 is provided to be joined with the inlet port 98 and the inlet port 102 in the end shells 82 and 84, respectively, to communicate the reference pressure chamber 68 to a chamber 116 behind the valve carrying wall 92. The port 108 is opened to surrounding atmosphere to communicate chamber 118 ahead of the wall 92 to atmosphere at all times whereby vacuum being in chamber 116 and atmosphere being in chamber 118 will maintain the valve carrying wall 92 in the rear attitude shown in FIG. 1 and permit only limited travel of the valve operating mechanism.

Within the movable wall structure 92 the valve mechanism is arranged to comprise a follow-up type valve poppet 120 within a rearwardly projecting boss 122 that extends to the right, as viewed in the drawing, through the end shell 84. A movable valve seat 124 is supported by the structure of the movable wall 92 and connected to a push rod 126 from the brake pedal 16 to be normally projectable to the left, as viewed in the drawing whereby the rubber poppet 120 will seat on annular valve seat 128 of the movable wall structure 92 so that further movement of the seat 124 will open the atmospheric inlet 72 to a discharge port 130 of the structure 92. In the condition of these valve elements shown, a reference pressure inlet port 132 is open around seat 128 to the discharge port 130. A conduit means 134 communicates the area within the boss 122 behind the seat 128 to a passageway 136 in the structure 92. This passageway 136 opens to a reaction pressure chamber 138 in the structure 92 that is created therein by a diaphragm assembly 140 to also provide a reference pressure chamber 142 on the other side of the diaphragm assembly 140. A counter reaction spring 144 is located in the chamber 142 between the structure of the movable wall assembly 92 and the diaphragm assembly 140 to normally urge the latter to a forwardmost position whereby the volume of chamber 138 is at a minimum and the volume of chamber 142 is at a maximum. Chamber 142 is open by means of port 146 to the reference pressure chamber 116 behind the valve carrying wall structure 92. It should be noted that the conduit means 134 may be replaced by passage means completely internally of the structure 92.

Discharge port 130 for the valve carrying wall assembly 92 is connected by a conduit 148 to a fitting 150 within which an end portion 152 of conduit 112 is press fitted. End fitting 150 is sealingly retained in port 100 by means of a snap ring 154. Thus, the valve discharge port 130 is communicated to solenoid valve 56 for communication via conduits 60 to control pressure chambers 62 and 64. A return spring 156 is assembled between end shell 82 and the wall 74 to maintain the normal released position of the walls 74 and 76 connected together by means of a hub 158 having bores 160 and 162 from opposite ends receiving a force transmitting rod 164 and push rod 166, respectively. The hub 158 is supported and sealed with respect to partitions depending from the intermediate structures 86 and 88 at spaced points and retained on the movable walls by snap ring provisions. Bore 160 also serves as a communication of reference pressure chamber 68 with reference pressure chamber 70 by means of radial ports 168 in front of and adjacent the connection of wall 76 with the hub 158.

Force transmitting rod 164 extends through the forward end shell 82 to be connected with a primary piston 170 within a bore 172 of master cylinder 14. Primary piston 170 is in turn connected via a cage spring assembly 174 to a floating piston 176 whereby a primary chamber 178 is created between the pistons 170 and 176 and the secondary chamber 52 is between the piston 176 and the end of the bore 172. A return spring 180 is slightly compressed in the normal released attitude of pistons 170 and 176 between the piston 176 and the housing about the end of the bore 172 to maintain the released position of the pistons 170 and 176 and in addition provide a slight supplemental force for the return spring 156 of the motor 12. Thus the master cylinder 14 is of a split system type capable of developing separate pressures, as aforementioned, from a supply of hydraulic fluid contained in separate reservoirs 182 and 184 closed by a common cap 186 and diaphragm 188 upon the assembly of bail 190 to housing 192 of master cylinder 14 to fit over cap 186 and normally reside in centrally located indentations (not shown).

With respect to FIG. 2, the conduits 114, 66 and 60 are shown in reversed attitude from that of FIG. 1; but, otherwise, there is no change in the structure of the motor 12 that is separately depicted in FIG. 2. Essentially the purpose of FIG. 2 is to show the integration of the solenoid valves 56 and 58 and their elements. More particularly, the solenoid valve 56 has a normally open valve poppet 192 carried by a resilient metal support 194 between the joint of valve housing 196 with a flanged opening 198 of conduit 60 to also act as a seal between this juncture. The support 194 may be in the form of spring fingers or a perforated diaphragm. Within the housing 196 a coil 200 and a core 202 are arranged behind a valve seat 204 facing the poppet 192. As indicated when using a metal diaphragm 194, a plurality of radial holes in the area between the poppet 192 and the peripheral sealing portion are provided in order to communicate around the poppet 192. In the position shown by FIG. 2 the chamber 206 communicable with conduit 112 is thus open to the interior of conduit 60 having connections 208 and 210 with ports 106 and 104, respectively.

Solenoid valve 58 also has a poppet 212 connected by a spring or resilient diaphragm 214 to the juncture of solenoid housing 216 with conduit 66 formed as a portion of conduit 60 in this design of FIG. 2. Again the solenoid housing has within it a coil 218 and a core 220 behind a valve seat 222 facing the poppet 212.

Spring or resilient diaphragms 194 and 214 of solenoid valves 56 and 58 are designed to maintain poppet 192 normally open and poppet 212 normally closed; i.e., poppet 212 seats on an opening 224 of conduit 66 into chamber 226 of valve 58 leading, via spaced radial passages in resilient diaphragm 214 to an opening 228 from chamber 226 to the interior of conduit 60. Both the poppets 192 and 212 have center areas 230 and 232, respectively, of a material which is attractable by cores 202 and 220, respectively.

In closing this description of a manner of construction of the structure meeting the concepts of our invention, the vacuum check valve 110 is shown to comprise a rubber poppet 234 snap fitted to housing core 236 to prevent entry of anything but vacuum to the reference pressure chamber 68 and the interior of conduit 66.

OPERATION

With regard to the operation of the structure of our invention, it should be understood that when the vehicle operator depresses the brake pedal 16 and closes the contacts associated with plunger 42 of switch 40, he not only sets in motion the valve poppet 120 and the movable valve seat 124, but activates the computer system 38 electrically connected to vehicle deceleration sensing means 32 on the front wheel brake disc 36. In that the poppet 192, see FIG. 2, is normally open, the vehicle operator will first lap the communication of reference pressure via inlet port 132 in valve structure 92 to the conduit 148 connected to valve discharge port 130 and via conduit 112 and conduit 60 to the control chambers 62 and 64. Next he will open the atmospheric inlet 72 of the boss 122 of the valve carrying wall assembly 92 to provide a pressure differential via the same conduits to the chambers 62 and 64. This will then cause a projection of the force transmitting rod 164 to close off compensating port means shown with respect to master cylinder housing 192 between the reservoirs 182 and 184 and the secondary and primary chambers 52 and 178, respectively, as there always exists atmospheric pressure in chamber 118 and vacuum in chamber 116 so long as an adequate drawing of vacuum has been provided to the motor 12, the brake pedal will be permitted only limited movement; i.e., movement sufficient to fully open the movable seat 124 from the following type poppet 120. However, as the atmospheric pressure being introduced to control chambers 62 and 64 is also connected via conduit 134 and passage 136 to the left side of diaphragm assembly 140, it will provide a pressure for the reaction chamber 138 that will eventually overcome counter-reaction spring 144 providing a reaction force on brake pedal 16 giving the operator a sense of feel of braking that will match his sense of deceleration in the operator's compartment of the vehicle.

Whenever the braking pressure develops in the primary chamber 174 begins to approach a value that will lock the brake disc 36, the sensor 32 will call upon the computer system 38 to provide a signal first to the solenoid valve 56 to magnetize the core 202 and pull poppet 192 onto seat 204. This terminates the communication of the operator-operated control valve means comprising the movable seat 124 and follow-up poppet 120 from the control of pressure differential across walls 74 and 76. If the sensor 32 senses a further increase in deceleration of brake disc 36, the computer system 38 will then energize coil 218 to magnetize core 220 and thus pull poppet 212 away from opening 224 of conduit 66 to chamber 226. At this time vacuum will be drawn in conduit 60 between the now closed poppet 192 and the inner confines of control pressure chambers 62 and 64 whereby return spring 156 and any supplement due to hydraulic force in chambers 178 and 52 as well as the force of return spring 180 will cause a retraction of walls 74 and 76; but, more importantly, a retraction of pistons 170 and 176 in the bore 172 will increase the displacement in the brake system whereby the vehicle braking action may be decreased until the sensor 32 signals the computer system 38 to again close the poppet 212 by release of the magnetism on core 220 sufficient to permit resilient diaphragm 214 to bring about this seating.

It should be noted that at the same time that this is going on, the vehicle weight is being shifted from the rear axle to the front axle and spring 46 is causing the closing of internal valving details of proportioning valve 24 to terminate the communication of conduit 20 with conduit 26. It should be understood by all that the pressure being supplied via conduit 26, valve 24 also is reactive in the valve to bring about continued modulation of the pressure to wheel cylinders 28 in accordance with the force of spring 46 on lever 44 regulating the biasing force on the elements within the valve 24 in opposition to the hydraulic pressure being delivered thereto via conduit 20 from the master cylinder 14.

Thus, whereas the front wheels are prevented from locking in view of a means sensing their rate of deceleration, the rear wheels are not only controlled off the front wheels, but in accordance with the load shifting caused by deceleration of the vehicle.

In the event of a control pressure loss such as the development of atmosphere within the vehicle's engine intake manifold and the elimination of vacuum in reference pressure chambers 68, 70 and 116, the movable wall structure 92 is able to follow up the movement of wall 74 or 76 and cause further movement thereof or, if this happens, initially the initial movement thereof to pressurize the primary and secondary chambers 178 and 52, respectively, of the master cylinder 14 to effect vehicle braking. Under these conditions, the anti-skid system is still operative, however, the valves 56 and 58 would not be effective to permit the introduction of vacuum to the control chambers 62 and 64 so that they would not interfere in the manual braking by the vehicle operator.

Having fully described an operative construction of structure meeting the principles of our invention, it is now desired to set forth the intended protection sought by these Letters Patent in the appended claims.

We claim:

1. A fluid pressure servomotor comprising:
   a housing having port means in each end and between the ends;
   movable wall means in said housing dividing said housing into a control pressure chamber and a reference pressure chamber;
   operator-operated valve means operatively related to said movable wall means for introducing a control pressure to said control chamber, said valve means having a housing with a control pressure inlet, a reference pressure inlet and a discharge port between which a valve poppet means is movable to normally communicate the reference pressure to the discharge port, to close same and to open control pressure to said discharge port;
   conduit means communicating said discharge port to said control pressure chamber;
   a first normally open valve in said conduit, said first valve being between said discharge port and said conduit and a second valve being between said reference pressure chamber of said servomotor and said conduit, said first valve and said second valve being sequentially operable to automatically remove communication of said discharge port to said control pressure chamber and open said reference pressure chamber thereto to regulate work output of said servomotor; and
   said servomotor being connected to a vehicle brake system including means sensing wheel braking connected via computer means to said first valve and said second valve for the sequential operation of same.

2. A fluid pressure servomotor according to claim 1 having a means to normally prevent operation of said first valve and said second valve until operation of said operator-operated valve means.

3. The structure of claim 2 wherein said servomotor has a split master cylinder one portion of which is connected to a portion of the vehicle brake system and another portion of which is connected to another portion of the vehicle brake system.

4. The structure of claim 3 wherein said one portion only of the vehicle brake system has the means sensing wheel braking.

5. The structure of claim 4 wherein said another portion of said vehicle brake system has between it and said another portion of said split master cylinder a load proportioning valve to further regulate braking pressures in said another portion on the basis of load shift between the one portion and the another portion of the vehicle brake system.

6. The structure of claim 1 wherein said servomotor has a split master cylinder one portion of which is connected to a portion of the vehicle brake system and another portion of which is connected to another portion of the vehicle brake system.

7. The structure of claim 6 wherein said one portion only of the vehicle brake system has the means sensing wheel braking.

8. The structure of claim 7 wherein said another portion of said vehicle brake system has between it and said another portion of said split master cylinder a load proportioning valve to further regulate braking pressures in said another portion on the basis of load shift between the one portion and the another portion of the vehicle brake system.

9. A vehicle brake system comprising:
   front brake means having a deceleration sensing means;
   rear brake means;
   a servomotor having a means to produce separate fluid pressures respectively for and linked to said front brake means and said rear brake means, said servomotor also having a pair of work producing walls and a valve carrying wall within a housing, which valve carrying wall has valve means for controlling fluid pressure differential across said work producing walls, said servomotor having a conduit connecting said valve means to control chambers of said servomotor;
   solenoid valve means in said conduit having a normally open valve and a normally closed valve arranged to normally permit control of the servomotor by said valve means of said valve carrying wall; and
   computer means connected between said deceleration sensing means and said solenoid valve means to automatically change control of said servomotor from said valve means of said valve carrying wall to said solenoid valve means.

10. The system of claim 9 and further comprising a brake pressure proportioning device connected between said rear brake means and said means to produce separate fluid pressures.

11. The structure of claim 10 wherein said brake pressure proportioning device is characterized as a load sensitive brake proportioning valve responsive to load shifts between from said rear brake means to said front brake means whereby rear brake means effectiveness may be maintained at the desired ratio to front brake means effectiveness.

References Cited

UNITED STATES PATENTS

| | | | |
|---|---|---|---|
| 2,395,401 | 2/1946 | Eaton | 91—33 |
| 2,919,162 | 12/1959 | Roberts | 303—21 |
| 3,291,538 | 12/1966 | Bulgin | 303—21 |
| 3,357,311 | 12/1967 | Cripe | 91—32 |
| 3,415,577 | 12/1968 | Walker | 303—21 |
| 3,422,622 | 1/1969 | Arentoft et al. | 60—54.5 |
| 3,449,019 | 6/1969 | Walker | 303—21 |

MILTON BUCHLER, Primary Examiner

J. J. McLAUGHLIN, Jr., Assistant Examiner

U.S. Cl. X.R.

60—54.5; 91—33; 188—181; 303—6, 22